Oct. 30, 1956   A. GUYENNON   2,768,586
CONNECTING ROD BEARING ASSEMBLY FOR PUMP OR THE LIKE
Filed March 29, 1955   3 Sheets-Sheet 1

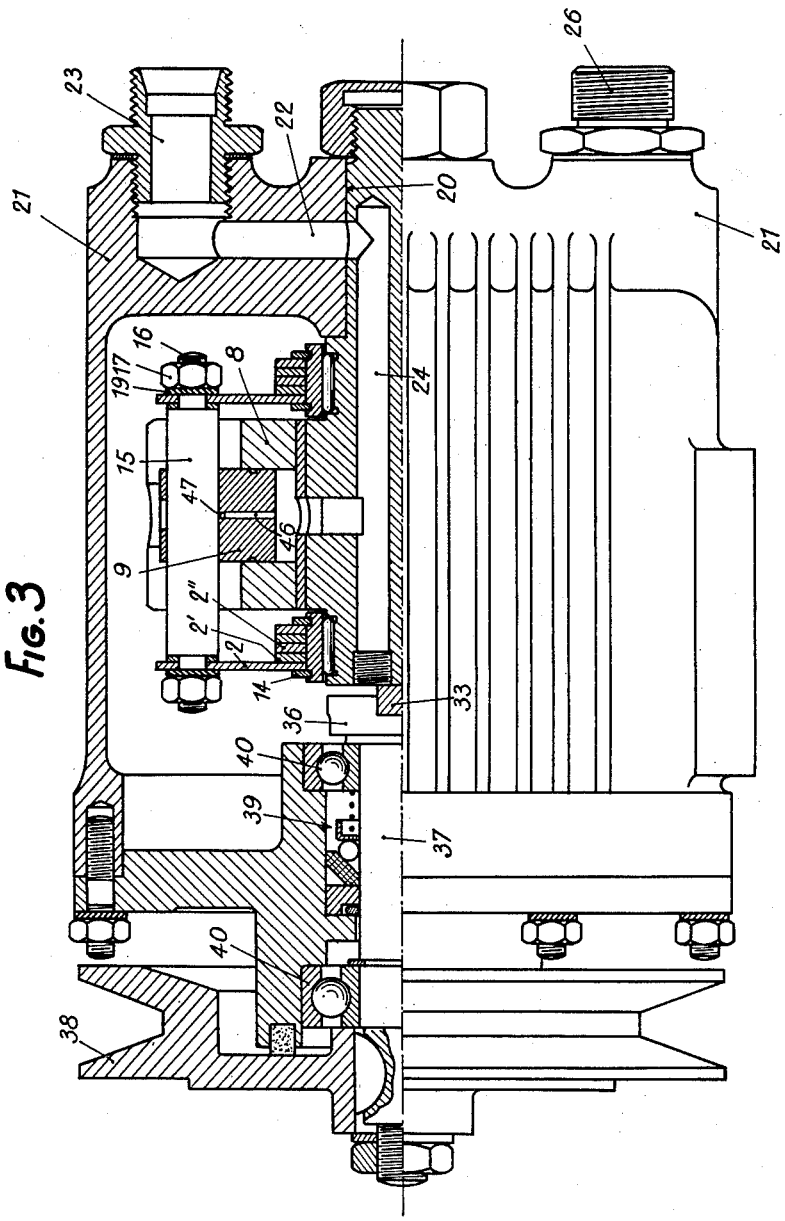

Oct. 30, 1956 A. GUYENNON 2,768,586
CONNECTING ROD BEARING ASSEMBLY FOR PUMP OR THE LIKE
Filed March 29, 1955 3 Sheets-Sheet 3
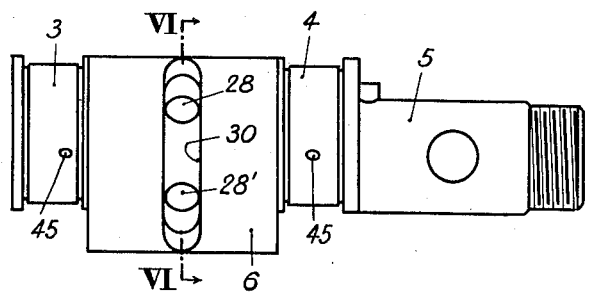
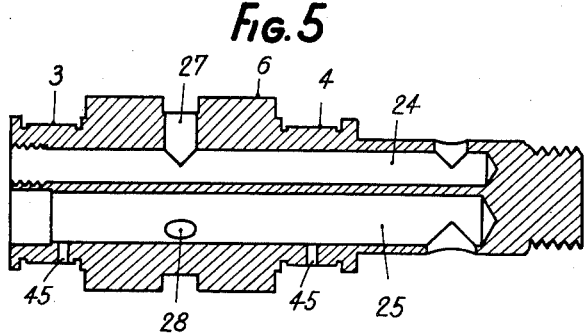
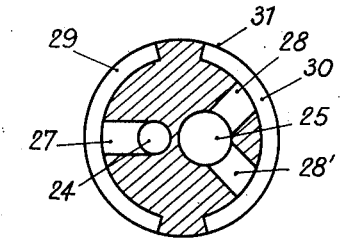
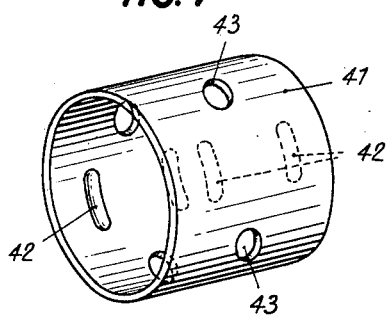
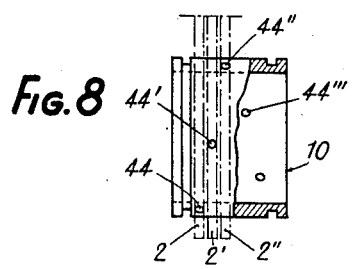

ered Oct. 30, 1956

United States Patent Office 2,768,586
Patented Oct. 30, 1956

2,768,586

CONNECTING ROD BEARING ASSEMBLY FOR PUMP OR THE LIKE

André Guyennon, Montpellier, France

Application March 29, 1955, Serial No. 497,741

7 Claims. (Cl. 103—161)

The present invention relates to a connecting-rod bearing arrangement for pumps, compressor and like machines comprising at least one crankshaft distributor shaft wherein the fluid is circulated, and a plurality of pistons disposed radially to this shaft and mounted for sliding motion in cylindrical bores or cylinders adapted to rotate bodily with respect to said distributor shaft, these pistons being reciprocated in their relevant cylinders or the like by a connecting-rod bearing assembly mounted on eccentric journal portions of the distributor shaft.

As a rule, pumps of this type comprise a member or body surrounding the crankshaft-forming distributor shaft, in which cylindrical bores are formed and adapted slidably to receive the pump pistons. The number of bores is usually five, six or more and the commonest arrangement comprises in the connecting-rod bearing assembly of this type the combination of a main connecting-rod mounted on a main journal of the distributor shaft with a plurality of secondary connecting-rods mounted on the main connecting-rod.

Generally, the diameter of the piston-carrying member in which the cylindrical bores are formed is relatively small, whereas the diameter of the crankshaft-forming distributor shaft should be relatively important so that fluid-circulation ducts or passages may be provided therein. As a result, the throw of the pivot pins of the big-ends of the secondary connecting-rods is very important, due allowance being made for the length of these secondary connecting-rods, and as a consequence of these conditions when the assembly operates the leading angle between the secondary connecting-rods and the pistons attached thereto varies to a substantial extent. Now anybody conversant with the art knows that the greater this angle, the quicker the ovalization of the cylinder bores. Besides, the arrangement comprising a main connecting-rod associated with a plurality of secondary connecting-rods offers the drawbacks of being cumbersome and noisy.

The connecting-rod bearing arrangement according to this invention is designed to avoid the inconveniences set forth hereinabove, and remarkably notably by the fact it comprises a plurality of small plates, links or the like, independent of one another and journalled on a common axial portion or on adjacent journal portions of the aforesaid distributor shaft, each plate, link or the like having its opposite end connected to a relevant piston.

According to another feature of the invention, the small plates, links or the like are mounted side by side on a small journal portion of the distributor shaft.

This connecting-rod bearing assembly has many advantages in comparison with the known devices. Firstly, each piston is adapted rotatably to drive separate connecting-rods or links all of which are journalled on the distributor shaft. Therefore, the distance between the axis of oscillation of each link and its point of attachment with the relevant piston is constant and may be equal notably to the corresponding distance measured on the main connecting-rod of the above-mentioned hitherto known connecting-rod bearing assemblies.

Consequently, in an arrangement according to this invention each link cooperates with the relevant piston by forming therewith an angle varying between 0 degrees and a very low value which is the same for all the pistons of the apparatus concerned. The operation of an apparatus equipped with a connecting-rod bearing assembly of this character is definitely improved because the reactions between the connecting-rod and the pistons vary in the same manner during one cycle, irrespective of the particular piston and connecting-rod assembly considered so that these reactions may compensate one another. The connecting-rods accomplish an oscillatory movement of constant amplitude about the journal of the distributor shaft on which they are mounted, so that the stresses applied to this journal are regularly distributed.

On the other hand a particularly noiseless operation is obtained due to the simple fact that the connecting-rod forming links are in sliding engagement with one another during the operation of the apparatus. Besides, the overall dimensions of a connecting-rod bearing assembly of this character may be reduced to a considerable extent by providing relatively thin metal plates or links juxtaposed in mutual face-to-face engagement with one another on a common journal portion of the distributor shaft.

With this arrangement it is possible to employ very simple means to be described presently for driving the piston-carrying rotary member in which the cylindrical bores are formed.

It is another object of this invention to provide a pump, compressor or the like, of the type mentioned hereinabove equipped with a connecting-rod bearing assembly made in accordance with the teachings of this invention, this pump or the like being remarkable notably in that its crankshaft-forming distributor shaft carries on one or more eccentric journal portions a plurality of small plates, links or the like, independent of one another and each connected, by pair or by more than one pair to one or a plurality of pistons, said small plates, links or the like being adapted to oscillate with respect to one another about a common axis when drivingly rotated by the pistons about the distributor shaft.

Other features and advantages of this invention will become apparent as the following description proceeds with reference to the attached drawings showing diagrammatically by way of example one form of embodiment of the invention.

In the drawings:

Figure 3 is an elevational and part-sectional view showing a pump equipped with the assembly of this invention;

Figure 4 is an elevational lateral view showing the distributor shaft of the pump illustrated in Fig. 3;

Figure 5 is a longitudinal axial section of the shaft shown in Fig. 4;

Figure 6 is a cross-section taken upon the line VI—VI of Fig. 4;

Figure 7 is an isometric view showing a detail of the pump of Fig. 3, and

Figure 8 is an elevational, part-sectional view showing a bushing or like member on which the connecting-rod bearing assembly is mounted.

Figure 1:
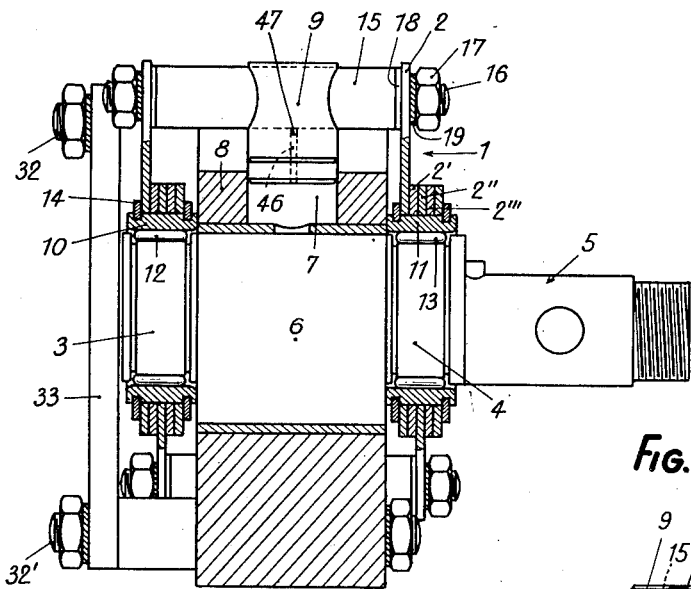
Figure 1 is an elevational and part-sectional view showing a connecting-rod bearing assembly according to the present invention.
Figure 2:
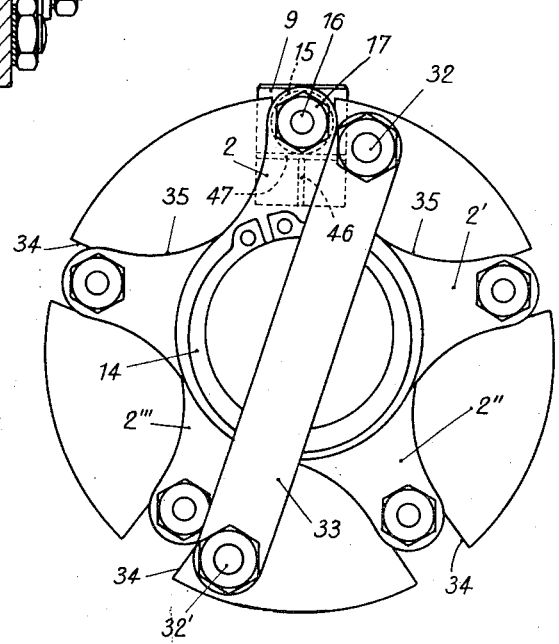
Figure 2 is a front view of the assembly.

In the example illustrated in Figs. 1 and 2 of the drawings, a connecting-rod bearing assembly 1 for a radial-piston pump consists of a number of small metal plates, links or the like 2, 2', 2'', 2''' independent of one another. These links are mounted side by side on cylindrical journals 3, 4 formed on the crankshaft-forming distributor shaft 5 of the pump. These journals 3, 4 have a common axis parallel to the axis of shaft 5 and are disposed on either side of the main shaft portion 6 in the axial direction so as to register with the cylindrical bores 7 of the rotary member 8 in which the pistons 9 are slidably mounted. Of course, the links 2, 2', 2'' may be mounted on journals located very close to the distributor shaft but the arrangement illustrated makes it possible by employing very thin metal links, to construct a connecting-rod bearing assembly having very small overall dimensions. These links 2, 2', 2'' are mounted on their distributor shaft either directly, or as shown, through the medium of bushings or bearings 10, 11 carried in turn by needle or roller bearings 12, 13. It is also possible to mount these links directly on the bearing needles or rollers. The links are held against axial displacement by any suitable and known means, such as circlips 14 engaging grooves formed for this purpose in the bushings 10, 11. The links are disposed in spider fashion so as to be connected by pair, for example, with the pistons 9, by means of pins 15 extending through the pistons and pivotally mounted therein without clearance.

This mounting may be carried out in the manner shown in the drawings by forming an orifice through the end of each link, this orifice being engaged by the relevant screw-threaded extremity of the pin 15. A nut 17 is screwed on this extremity so as to clamp the link between a shoulder 18 formed on the pin and a lock washer 19.

Two or more links mounted on a common journal may be associated with the same piston; alternatively, if the crankshaft-forming distributor shaft is designed to carry several units of radial pistons, one or more links mounted on a common journal may be associated with a pair of pistons having the same angular setting with respect to the distributor shaft.

Other combinations and mountings may be contemplated by anybody conversant with the art without departing from the spirit and scope of the invention.

However, the preferred embodiment is the arrangement wherein two links of a pair of adjacent journals are coupled by pairs.

With this arrangement the stresses applied to each bearing 12, 13 are perfectly balanced. It is particularly advantageous in the case of a pump of the type illustrated in Fig. 3, due to the reduced over-all dimensions that can be obtained in the complete apparatus. One end of the crankshaft-forming distributor shaft is fitted and locked in a bore 20 formed in the case 21. A duct 22, opening into the bore 20 and into a nipple 23 adapted to be connected to a delivery pipe or duct, is drilled in the end flange of the case 21. This duct 22 communicates at its other end with a longitudinal passage 24 drilled in the shaft 5 and connected successively, during the rotation of the rotary member 8, with the cylindrical bores 7 in which the pistons 9 are slidably mounted. Another longitudinal passage 25 (Fig. 5) parallel to the passage 24 is drilled through the distributor shaft and opens into a suction orifice 26 formed for example in the lower portion of the case 21.

As illustrated in Fig. 6 the passages 24, 25 communicate with the peripheral portion of the distributor shaft through radial holes 27, 28 and 28' respectively, which open into channels 29, 30 slightly recessed with respect to the outer surface 31 of the shaft to facilitate the passage of the fluid from the inner ducts to the bores 7, and vice-versa.

The piston-carrying body 8 is provided with a pair of diametrally opposed pins 32, 32' or the like, on which a diametral connecting-strip 33 is fastened as shown.

These pins 32, 32' are substantially adjacent to the outer periphery of the member 8 and somewhat offset with respect to notches 34 formed in this member to permit the free movement of the piston pins 15.

Due to the oscillatory movements effected by the links 2, 2', 2'' . . . during the operation of the pump, and in order to prevent the pins 15 from interfering with these movements, the links have tapered end portions resulting from the provision of concave edges 35 gradually merging into these end portions, as shown.

The driving strip 33 is enclosed in a jaw-like member 36 rigid with a shaft 37 having keyed on its outer end a driving pulley 38. A shaft packing 39 is provided on this shaft 37 and a pair of bearings 40 are fitted between the shaft 37 and the case 21. The strip 33 may advantageously be driven through the medium of an Oldham coupling providing a certain clearance in the drive and therefore a greater flexibility of operation.

On the other hand a sleeve or like member 41 is a forced fit on the portion 6 of the distributor shaft 5 for the purpose of permitting a proper lubrication of this shaft portion. Inner cavities 42 are formed in the inner surface of this sleeve for lubricating purposes, as will be explained presently.

The pump described hereinabove operates as follows:

The pulley 38 causes the shaft 37 and therefore the strip 33 to rotate and the latter carries along the piston-carrying body 8 so that the latter will revolve about the axis of the distributor shaft 5; the throw of the connecting-rod bearing assembly causes the pistons 9 to be reciprocated in the cylindrical bores 7 formed in the body 8. This reciprocating motion determines in the inner portions of the bores 7 alternate suction and delivery effects which, through the suitably distributed orifices 27, 28 and 28' drilled in the shaft 5, cause the fluid to circulate in the desired direction within the inner ducts or passages 24, 25 of the distributor shaft.

As the suction and delivery effects occur at the outer surface of the shaft 5 they produce, as a rule, a very irregular distribution of the fluid circulating between the rotary body 8 and the shaft 5.

At the inlet end of the orifices 28, 28' the fluid circulating between the sleeve 41 and the shaft 5 undergoes a pressure drop urging the sleeve 41 and therefore the rotary body 8 towards the crankshaft axis. Moreover, at the same time and on the delivery side the fluid pressure tends to produce an action having the same direction. Both effects are thus complementary to each other and bring the distributor axis slightly out of centre with respect to the sleeve 41 while producing a very unequal fluid distribution which may even cause the seizing of the mechanical parts involved. However, due to the provision of the relay forming-cavities 42 provided inside the sleeve 41, the fluid accumulates therein on the delivery side and escapes therefrom on the suction side, thereby ensuring an improved distribution of the lubricating fluid and a smooth operation even at very high speed and under very strong pressures. If desired, orifices 43 for discharging and supplying the sleeve 41 may be provided and disposed with a certain angular offset with respect to the axes of the cylinders 7 to facilitate the filling by introducing a certain lag in the suction and delivery closings.

On the other hand, and as illustrated in Fig. 8, a bushing 10 designed to carry the links 2, 2', 2'' . . . may be provided with lubricating holes 44, 44', 44'' . . . for connecting the inner surface with the outer surface of this bushing, and another series of radial holes 45 drilled through the distributor shaft cause the journal portions 3, 4 thereof to communicate with the inner passages thereof where the fluid circulates. Preferably, as shown, these orifices 45 lead into the suction passage 25. The orifices 44, 44', 44'' . . . are axially displaced along the bushing 10 so that each of them will lubricate one portion of the bushing on which the link 2, 2' or 2'' . . . is mounted, and consequently when the parts are assembled each orifice will register with, and lubricate, a separate link of the connecting-rod assembly.

Finally, the piston pins 15 may be lubricated by one or more orifices 46 drilled radially through the piston 9 to connect the cylinder 7 and the bore of the piston in which the pin is mounted. The lubrication of the lateral surface of the piston may take place similarly through an axial orifice 47 communicating for example with the orifice 46. These orifices 46, 47 are thus supplied with fluid in a very simple manner. Obviously, the provision of lubrication orifices 44, 45 in the sleeve member and in the shaft journal portions, as well as of orifices 46, 47 in the piston mountings, is to be contemplated only in those cases where the fluid handled by the pump has a viscosity sufficient to enable this fluid to act as a lubricant.

Of course, the invention is not restricted to the form of embodiment shown and described herein, as many modifications may be brought thereto without departing from the spirit and scope of the invention.

What I claim is:

1. A pump, compressor or the like comprising a crankshaft-forming-distributor shaft comprising duct means for the circulation of the fluid and an eccentric journal portion, said duct means opening on the external surface of a portion of said shaft, a rotor member journalled on said portion and rotating relatively to said distributor shaft, inner cylinders disposed radially in said rotor communicating with said duct means during the rotation of said rotor on said portion, several pistons slidably mounted within said cylinders, a plurality of thin plate means independent of one another, threaded in face to face relationship and pivotally mounted at one end on said common eccentric journal portion of said distributor shaft, each of said thin plate means having its end connected to one of said pistons, and being adapted to oscillate with respect to one another about said journal portion, and stop means for maintaining said plate means longitudinally on the relevant eccentric portion of said shaft.

2. A pump, compressor or the like as claimed in claim 1 in which said thin plate means consist of metal plates, of reduced thickness, and a common bushing means for said plates for the mounting thereof on said common portion.

3. A pump, compressor or the like as claimed in claim 2 comprising two separate journal portions on the distributor shaft disposed on either side of the pistons, the thin plates being divided into two groups mounted on said two separate journal portions, and a pin mounted in and extending through each of said pistons, the thin plates of the groups being associated by pairs, the thin plates of each of said pairs being connected to a common piston through the pin extending through said piston.

4. A pump, compressor or the like as claimed in claim 2 in which said bushing means is provided with lubrication holes, the relevant journal portion comprising in turn at least one orifice communicating with said duct means in said shaft.

5. A pump, compressor or the like as claimed in claim 4 in which the lubrication holes of said bushing means are axially displaced with respect to one another so as to ensure the lubrication of separate portions of said bushing means, each of said holes corresponding substantially to a different thin plate of the connecting-rod bearing assembly.

6. A pump, compressor or the like as claimed in claim 1 comprising gudgeon pin means carried by said rotor member for rotatably driving same, said gudgeon pin means being disposed substantially along one diameter of said rotor member and a transverse member for interconnecting said gudgeon pin means.

7. A pump, compressor or the like as claimed in claim 6 comprising a member of the Oldham coupling type said transverse member having its extremities angularly offset with respect to the end of said thin plate means and being driven by said member of the Oldham coupling type.

References Cited in the file of this patent

UNITED STATES PATENTS

| | | |
|---|---|---|
| 2,363,162 | Tripp | Nov. 21, 1944 |
| 2,426,588 | Benedek | Sept. 2, 1947 |
| 2,646,756 | Peguet et al. | July 28, 1953 |

FOREIGN PATENTS

| | | |
|---|---|---|
| 454,441 | Italy | Jan. 19, 1950 |
| 475,209 | France | of 1915 |